(No Model.)
J. HUTCHISON.
FEEDER AND SEPARATOR FOR MILLSTONES.
No. 249,628. Patented Nov. 15, 1881.
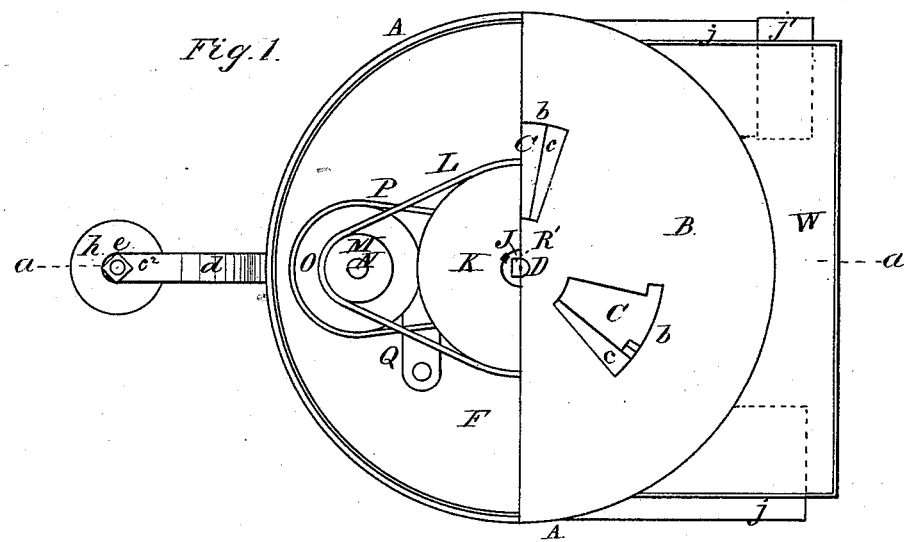
Fig. 1.
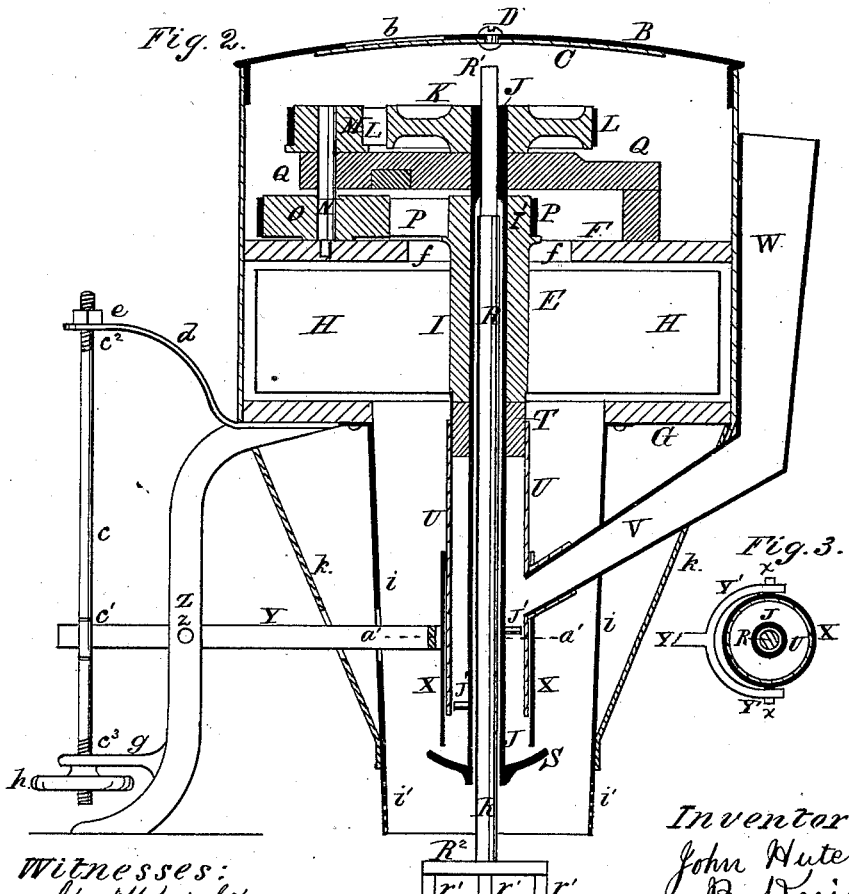
Fig. 2.
Fig. 3.
Witnesses:
Geo. H. Knight.
Walter Allen
Inventor:
John Hutchison
By Knight Bro.
Attys.

UNITED STATES PATENT OFFICE.

JOHN HUTCHISON, OF THREE RIVERS, MICHIGAN.

FEEDER AND SEPARATOR FOR MILLSTONES.

SPECIFICATION forming part of Letters Patent No. 249,628, dated November 15, 1881.

Application filed April 5, 1880. (No model.)

*To all whom it may concern:*

Be it known that I, JOHN HUTCHISON, residing at Three Rivers, in the county of St. Joseph and State of Michigan, have invented Improvements in Feeders and Separators for Millstones, of which the following is a specification.

My improvement relates to a device for feeding grain to millstones and at the same time separating the dust from it, and the scope of the invention is set forth in the claims, reference being had to the general description.

In the drawings, Figure 1 is a top view with half of the cover or top removed. Fig. 2 is a section at $a\ a$. Fig. 3 is a transverse section at $a'\ a'$.

A is the case, and B the top or cover of the same. The top has a number of air-holes, $b$, that may be adjusted in size by a damper, C, in contact with the under side of the top, and having a number of apertures, $c$, that may be brought in conjunction with the apertures $b$ by turning the plate C on its central pivot, D; or the damper-plate C may be so adjusted as to close or partly close the apertures $b$. As shown in the drawings, the apertures $b$ are about one-fourth open. The purpose of these apertures is to allow the downward passage of air to supply more or less of the demand of the rotary fan or blower E, the air entering through the apertures $b\ c$ passing down through a central hole, $f$, in the top F of the fan-case F G.

H H are the blades of the fan, fixed to a tubular hub, I, which has bearing on a tubular shaft, J, and on the bearing-beam T.

K is a belt-pulley, fixed to the upper end of the tubular shaft J, connected by belt L with pulley M on a counter-shaft, N, whose lower end carries a belt-pulley, O, connected by a belt, P, with the belt-pulley I', forming the top of the tubular hub I of the fan. The relative size of the pulleys is such as to impart to the fan a greater speed than the shaft J, (in the same direction.) The tubular shaft J is supported at the upper end by the pulley K, which rests on the frame Q, which gives journal-bearing to the shafts J and N. The upper end of the bore of the tubular shaft J is angular, and in it fits the upper end, R', of the driving-spindle or driving-shaft R, so that the rotation of the driving-shaft causes the rotation of the tubular shaft, and consequently of the fan.

The lower end of the driving-shaft may rest upon and engage the rynd of the runner-millstone by the pins $r'$ upon its foot $R^2$, so that the driving-shaft receives rotation by the action of the runner.

T is a beam supporting the fan-hub I and giving journal-bearing to the tubular shaft J. To the beam T is fixed a tube, U, concentric with the tubular shaft J.

V is a feed-spout carrying grain from the hopper W to the annular space between the tube U and tubular shaft J. The grain descends in the tube U to the saucer S, fixed to the bottom of the tubular shaft J, from whence it is thrown out centrifugally by the rotation of the saucer.

X is a tubular case, telescoped on the tube U, to regulate the amount of grain thrown out of the saucer, as the lower edge of the tube X may be brought in close proximity to the saucer, so as to leave a very small aperture for the passage of grain between them. The position of the tube X is governed by a lever, Y, fulcrumed on the leg Z at $z$, and having a forked end, Y', connected to the tube X by pins $x$. The outer end of the lever passes through a slot, $c'$, in a rod, $c$, screw-threaded at the ends $c^2$ and $c^3$. The upper end of the screw-rod $c$ passes through a spring, $d$, and has a screw-nut, $e$, resting on the spring, the action of the spring being to draw up the outer end of the lever and lower the regulating tube or sleeve X. The screw-threaded end $c^3$ passes through a bracket, $g$, below which is a hand-nut, $h$, that may be turned to drawn down the end of the lever Y, and thus lift the regulating tube or sleeve X to increase the feed of grain.

$i$ is a case surrounding the tube U, and preferably perforated near the bottom, at $i'$, to allow the inward passage of air to supply exhaustion from the upper end of the tube caused by the fan.

It will be seen that the space within the case $i$ is in communication at top with the central part of the fan-case F G, so that air and dust, &c., from the grain discharged from the saucer will be drawn upward in said space, and, entering the fan-case, will be ejected from the circumference of the case through one of the tangential pipes $j$, according to the direction of rotation of the fan. The pipe $j$, through which the air is ejected, will be extended to any suitable place where the dust, &c., drawn up with the air through the case $i$ may be suitably discharged. The fan-discharge pipe $j$ which is not in use is covered by a cap, $j'$, so as not to interfere with the action of the fan.

The force of suction is adjusted by the turning damper C, for it will be seen that as more air is allowed to enter from above the force of the suction below to supply the demands of the fans will be decreased, and vice versa.

$k$ is a case outside of the case $i$.

At $J'$ are shown stirrers or agitators projecting from the tubular shaft J, to prevent the grain lodging fast in the space within the tube U.

The apparatus, when in use, is set upon the hoop or case of the millstones.

I do not confine myself to the driving-shaft R as a means of actuating the mechanism, for the shaft J might be turned by other means.

I claim as my invention—

1. The combination of tubular hub I, having fan-blades H, the hollow shaft J, and driving-shaft R R', the said hub, hollow shaft, and driving-shaft being all adapted to rotate in the same direction, and the fan independently of the tubular shaft, substantially as and for the purpose set forth.

2. The tubular shaft J, having saucer S at its lower end, in combination with shaft R R', pulley K, and hub I, having fan-blades H, as set forth.

3. The combination of driving-shaft R R', tubular shaft J, having stirrers J', grain-tube U, regulating-sleeve X, and saucer S, the said shafts and grain-tube being concentric with each other, substantially as and for the purpose set forth.

4. The combination of the tubular shaft J, having rotating saucer S, grain-tube U, casing $i$, hub I, having fan-blades H, and fan-case F G, the said casing opening into the center of the fan-case, and the fan turning on the tubular shaft and exhausting air from the casing $i$, as set forth.

5. The casing A, having top B, provided with openings $b$ and damper C $c$, in combination with fan I H, case F G, having opening $f$, casing $i$, and discharge $j$, as set forth.

JOHN HUTCHISON.

Witnesses:
W. J. COX,
JOSEPH M. KIRBY.